United States Patent [19]

McAlpine

[11] Patent Number: 4,518,014
[45] Date of Patent: May 21, 1985

[54] RELIEF VALVES FOR SANITATION SYSTEMS OR THE LIKE

[75] Inventor: James E. McAlpine, Glasgow, Scotland

[73] Assignee: McAlpine & Co., Ltd., Glasgow, Scotland

[21] Appl. No.: 350,545

[22] Filed: Feb. 19, 1982

[30] Foreign Application Priority Data

Feb. 21, 1981 [GB] United Kingdom ............... 8105546
Apr. 22, 1981 [GB] United Kingdom ............... 8112503

[51] Int. Cl.³ ............................................. F16K 15/14
[52] U.S. Cl. ..................................... 137/843; 137/526; 137/540
[58] Field of Search ........... 137/526, 540, 217, 516.11, 137/516.21, 860, 513.5, 855, 843, 852, 543.15

[56] References Cited

U.S. PATENT DOCUMENTS

| | | | |
|---|---|---|---|
| 1,681,364 | 8/1928 | Richardson | 137/516.21 |
| 2,725,076 | 11/1955 | Hansen et al. | 137/543.15 |
| 2,803,265 | 8/1957 | Coffey | 137/516.21 |
| 3,403,696 | 10/1968 | Pynchon | 137/852 |
| 3,923,081 | 12/1975 | Persson | 137/217 |
| 3,973,588 | 8/1976 | Holst | 137/854 |
| 4,436,107 | 3/1984 | Persson | 137/526 X |

Primary Examiner—Martin P. Schwadron
Assistant Examiner—Stephen M. Hepperle
Attorney, Agent, or Firm—Krass & Young

[57] ABSTRACT

A relief valve for sanitation systems, said relief valve incorporating a valve seat 11, 25, within a valve chamber 5, 22, and a freely flexible valve element 12, provided for engagement with the valve seat 11, 25 to prevent inflow of air to the valve chamber 5, 22 through an air inlet 10, 26. Guide means 16, 17 are provided for assisting the valve element 12 into sealing engagement with the valve seat 11.

9 Claims, 4 Drawing Figures

RELIEF VALVES FOR SANITATION SYSTEMS OR THE LIKE

This invention relates to relief valves for sanitation systems or the like.

Such valves have previously been proposed for the purpose of admitting air into a pipe in response to a reduction in pressure in the pipe. Examples of such valves are described, for example, in British Pat. No. 1433446 as well as in our co-pending Patent Application No. 8041440. Both British Pat. No. 1433446 and British patent application No. 8041440 disclose arrangements in which a valve chamber communicates with a pipe through an annular inlet defined by inner and outer concentric valve seats. The annular inlet opening is closeable by an elastomeric valve element having holes therethrough and extending across the inlet to engage both valve seats. The valve element is normally biased into engagement with the inner and outer concentric valve seats to assist in preventing inflow of air from the inlet opening into the valve chamber. If there is a pressure reduction within the pipe, then the valve element is displaced from the concentric valve seats to permit air to pass from the exterior of the relief valve into the valve chamber to eliminate the partial vacuum.

Such relief valves have particular application in sanitation waste pipe systems or in pipe systems associated with siphonic waste traps.

Such previously proposed valves, however, are of relatively complex construction and it is frequentlly difficult with inner and outer concentric seats, to achieve an adequate seal over an extended period of time. This is because, during use, the elastomeric valve element tends to become distorted and a satisfactory seal is not achieved.

An object of the present invention is to provide an improved construction of relief valve which only requires a single seat for an elastomeric valve element and which will consequently retain its sealing efficiency over an extended period.

According to the present invention there is provided a relief valve comprising a valve body defining a valve chamber therein, an air inlet interconnecting the valve chamber and the exterior of the valve body and defining a continuous valve seat within said valve chamber and surrounding the junction between the air inlet and the valve chamber and, a freely flexible substantially air impermeable valve element normally disposed in engagement with the valve seat to prevent inflow of air to the valve chamber through the air inlet, guide means for assisting the valve element into sealing engagement with the valve seat, and at least one aperture adapted to interconnect the valve chamber with a system into which the valve is fitted.

Preferably, the valve element is spring-loaded to tend to urge it into sealing engagement with the valve seat. Preferably also, the valve element is provided with a valve element support member on that face thereof opposite to the sealing face of the valve element, said valve element support member having projections engageable with guide means to ensure proper location of the valve element on the valve seat.

Embodiments of the present invention will now be described, by way of example with reference to the accompanying drawings in which.

Figure 1:
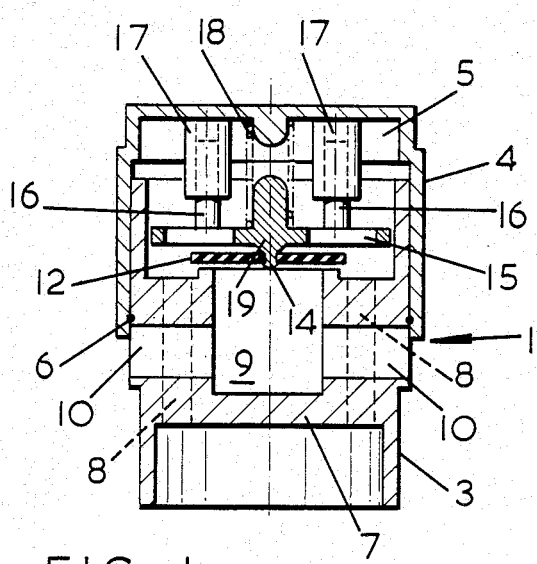
FIG. 1 is a vertical sectional view of a first embodiment of relief valve according to the invention.

Referring to FIG. 1 of the drawings, a first embodiment of relief valve comprises a cylindrical valve indicated generally by the reference numeral 1. The valve is made in two parts namely a body 3 over which a lid 4 can be releasably fitted to define a valve chamber 5 therewithin. The lid 4 is retained and sealed by an O-ring 6. Within the body 3 there is provided a deep partition 7 extending across the bore of the body 3. A plurality of vertical apertures 8 extend through the partition 7 to interconnect the valve chamber 5 with the underside of the partition 7 so that when the body 3 is fitted into a pipe, the pressure in the pipe will be transmitted to the valve chamber.

An axial well 9 opens at its upper end into the valve chamber 5, the well 9 being closed at its lower end. A pair of radial bores 10 communicate with the interior of the well 9 and extend through the body 3 to the exterior of the valve at a location just below the lower end of the lid 4 when the latter is fitted.

Surrounding the upper end of the axial well 9 is an upstanding annular valve seal 11. An annular flexible air impermeable valve element or seal 12 made of rubber or soft polyvinyl chloride or similar material is located within the valve chamber 5 to seat on the valve seat 11.

The valve element 12 has a single central hole which frictionally receives a central projection or pin 14 which is integral with a rigid spider-like support member 15 for the valve element 12. The central hole of the valve element 12 surrounds the pin 14 sufficiently closely that there is substantially no passage for air therethrough. The support 15 which is in the form of an annular grid, tends to prevent excessive distortion of the flexible valve element. Extending upwardly from the support member 15 are integral guide rods 16 which are received within cooperating sleeves 17 formed integral with the lid 4. The guide sleeves 17 ensure that on movement of the valve element 12, it returns accurately on to its valve seat. A spring 18 is disposed between the support 15 and the underside of the lid 4 in order to tend to urge the valve element on to its seat. It will be understood, however, that this spring loading is not essential. The underside of the valve support 15 is formed with a spacer 19 to space the valve element 12 from the support 15. In this way, the valve element 12 is freely flexible so that it can conform more easily to the shape of the valve seat in a self-aligning manner.

In operation of the relief valve, the valve element 12 normally is in engagement with its valve seat 11 under the combined effect of gravity and the spring.

If the pressure within the pipe into which the valve is fitted drops, then this drop in pressure is transmitted into the valve chamber 5 through the apertures 8 which are located radially outwardly of the outer extremity of the valve element 12. The reduction of pressure within the valve chamber 5 causes the valve element 12 to be lifted from its seat. This action allows air to be drawn into the valve chamber through the radial bores 10 and axial well 9 in order to balance the pressure.

The apertures 8 in the partition 7 also function as a means whereby condensation can flow out of the valve chamber should this eventuality arise.

Figure 2:
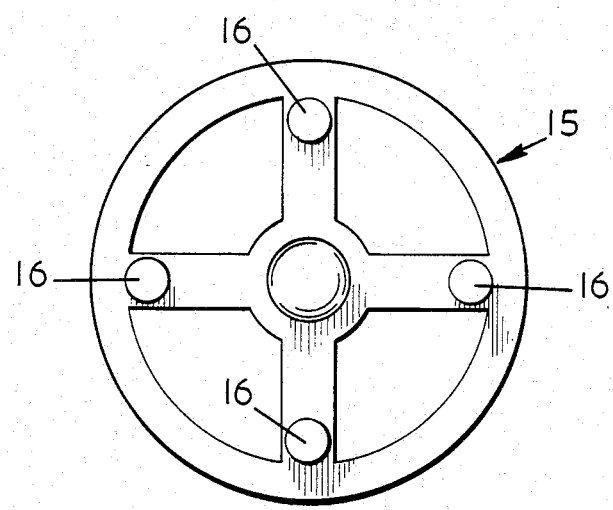
FIG. 2 is a plan view from above of a valve element support for the valve element of FIG. 1.
Figure 3:
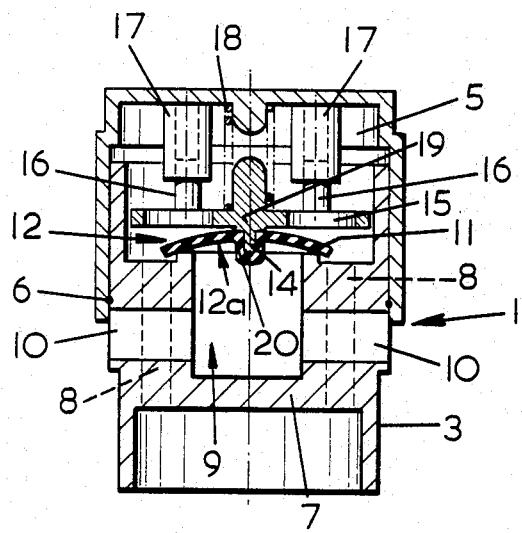
FIG. 3 is a vertical sectional view of a second embodiment of relief valve according to the invention and FIG. 4 is a vertical section of the body portion of a third embodiment of relief valve according to the invention in which the valve seat is offset relative to the vertical axis of the body portion.

The second embodiment of the invention illustrated in FIG. 3 is identical in construction and operation to the valve shown in FIGS. 1 and 2 save for variations in the form of the valve element 12 and the manner in which it is fitted to its support 15. In the embodiment shown in FIG. 3, the downwardly projecting central pin 14 of the support 15 is sufficiently long to project through the central aperture of the valve element 12 where it is surrounded and closed at its lower end by a shroud 20 which is integrally formed on the lower surface 12a of the valve element 12. Alternatively, the upper surface of the valve element 12 could be provided with an integral projection which frictionally engages in a recess formed in the lower face of the support 15. The lower surface 12a of the valve element 12 is concave in profile. As a result, the natural elasticity in the valve element and the fact that the effective area of the valve element is freely flexible ensures that a good sealing contact is made with the valve seat 11. The shroud 20 renders the valve element 12 air-impermeable and thus prevents the passage of air through the central hole of the valve element 12 so as to improve the efficiency of the valve.

Figure 4:
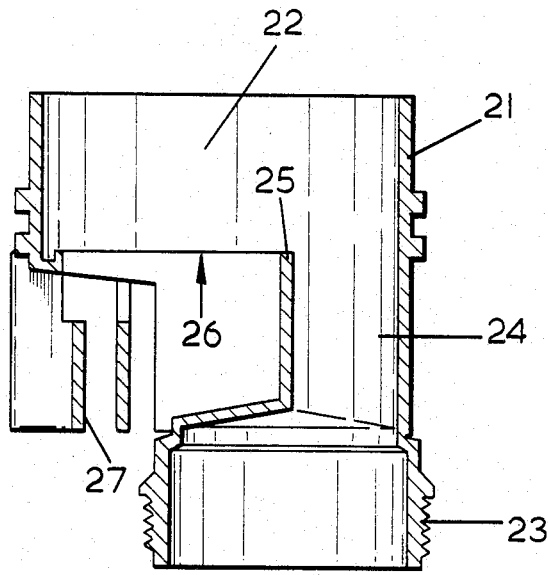

FIG. 4 illustrates the body portion 21 only of a relief valve in accordance with the invention and in which the lid, valve element and valve support are omitted for clarity. It will be understood, however, that these components can take the form described above in relation to the embodiments shown in FIGS. 1 to 3. The relief valve body 21 is of cylindrical form and in use is closed by a lid to define a valve chamber 22. The valve body 21 is adapted to be fitted into a pipe system by means of an integral externally screw-threaded skirt 23. A passage 24 connects the pipe system into which the valve is fitted to the valve chamber so that pressure variations in the pipe system will be transmitted to the valve chamber 22.

Within the valve chamber 22, there is provided an annular valve seat 25, the vertical axis of which is offset in relation to the vertical axis of the valve body 21. The valve seat 25 defines an air inlet 26 to permit the passage of air from the exterior of the valve to the valve chamber 22 through a grid 27 which restricts access to the interior of the vavle through the annular opening defined by the valve seat. The offset nature of the valve allows it to be fitted close to walls or the like obstructions which would cause difficulties in the fitting of valves as illustrated in FIGS. 1 and 3.

Although the above described embodiments incorporate a single spring centrally located relative to the valve element, it will be readily apparent to those skilled in the art that a plurality of springs can be provided around the perimeter of the valve element support if desired. The use of springs enables the valve to be used at an angle to the vertical.

If desired the valve element 12 and/or valve seat 11 can be lubricated with a non-druing lubricant such as castor oil or silicone. Such lubrication assists in a satisfactory seal being achieved.

The above-described embodiments show an arrangement in which the valve element is provided with a support which is slidable in guides provided on the inside of the lid. It will be readily apparent that the valve element can be guided on to its seat in other ways. For example, the central portion of the valve element could be provided with a depending projection which is slidable relative to an upwardly directed guide carried by the valve body.

The designs of the relief valve as described above are such that it is difficult for unauthorised persons, particularly children, to tamper with its internal components.

It desired the relief valve of the present invention can be provided with an insulating jacket e.g. of polystyrene in order to protect it against extreme temperature conditions.

It is claimed:

1. A relief valve comprising a valve body defining a valve chamber therein, an air inlet interconnecting the valve chamber and the exterior of the valve body and defining a single continuous valve seat within the valve chamber, a freely flexible substantially air-impermeable valve element normally disposed with a sealing face thereof in resilient, conforming engagement with the valve seat to prevent inflow of air into the valve chamber through the air inlet, a rigid support member, means mounting said flexible valve element to said support member with the face of the valve element opposite to said sealing face positioned in confronting, spaced relation to one face of said support member; and guide means including means on said support member and coacting means on said valve body for assisting the valve element into sealing engagement with the valve seat, and at least one aperture adapted to interconnect the valve chamber with a system into which the valve is fitted.

2. A relief valve as claimed in claim 1, in which the valve element is spring-loaded to tend to urge it into sealing engagement with the valve seat.

3. A relief as valve as claimed in claim 1 or 2, in which said guide means includes projections on the opposite face of said support member engageable with coacting guide means on said valve body to ensure proper location of the valve element on the valve seat.

4. A relief valve as claimed in claim 3, in which spacer means are provided between the central area of the valve element and the support member to maintain the spacing between said opposite face of said valve element and the confronting face of said support member and thereby ensure free flexibility of the valve element.

5. A relief valve as claimed in claim 1 or 2, in which the surface of the valve element which is adapted to engage the valve seat has a concave profile.

6. A relief valve as claimed in claim 4, in which the valve element is carried by the support member by means of a pin on the support member which frictionally engages a centrally-located hole in the valve element.

7. A relief valve as claimed in claim 6, in which a shroud is provided to prevent passage of air through said centrally-located hole.

8. A relief valve as claimed in claim 1 or 2, in which the air inlet defining the valve seat is co-axial with the valve body.

9. A relief valve as claimed in claim 1 or 2, in which the axis of the air inlet defining the valve seat is offset relative to the valve body.

* * * * *

UNITED STATES PATENT AND TRADEMARK OFFICE
CERTIFICATE OF CORRECTION

PATENT NO. : 4,518,014
DATED : May 21, 1985
INVENTOR(S) : James E. McAlpine

It is certified that error appears in the above–identified patent and that said Letters Patent are hereby corrected as shown below:

Column 1, line 31, delete "frequentlly" and insert --frequently--;

Column 2, line 30, delete "valve seal 11" and insert --valve seat 11--;

Column 3, line 14, and in all appearances thereafter, delete "12a" and insert --12a--;

Column 3, line 13, delete "shround" and insert --shroud--;

Column 3, line 47, delete "vavle" and insert --valve--;

Column 3, line 60, delete "non-druing" and insert --non-drying--; and

Column 4, line 9, delete "It" and insert --If--.

Signed and Sealed this

Eighth Day of October 1985

[SEAL]

Attest:

DONALD J. QUIGG

Attesting Officer

Commissioner of Patents and Trademarks—Designate